US012062325B2

(12) United States Patent
Tang et al.

(10) Patent No.: US 12,062,325 B2
(45) Date of Patent: Aug. 13, 2024

(54) DISPLAY PANEL AND DISPLAY DEVICE

(71) Applicant: Wuhan Tianma Micro-Electronics Co., Ltd., Wuhan (CN)

(72) Inventors: Shuo Tang, Wuhan (CN); Chuan Liu, Wuhan (CN); Zhihua Yu, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 17/963,847

(22) Filed: Oct. 11, 2022

(65) Prior Publication Data

US 2024/0005843 A1 Jan. 4, 2024

(30) Foreign Application Priority Data

Jun. 30, 2022 (CN) ......................... 202210755110.3

(51) Int. Cl.
*G09G 3/32* (2016.01)

(52) U.S. Cl.
CPC ....... *G09G 3/32* (2013.01); *G09G 2300/0426* (2013.01); *G09G 2300/0452* (2013.01); *G09G 2310/0267* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 2004/0095299 A1* | 5/2004 | Matsumoto | G09G 3/3241 | 345/76 |
| 2005/0225254 A1* | 10/2005 | Takai | G09G 3/3275 | 315/169.3 |
| 2007/0126671 A1* | 6/2007 | Naoaki | G09G 3/3225 | 345/77 |
| 2014/0071027 A1* | 3/2014 | Jin | G09G 3/3233 | 345/76 |
| 2021/0158755 A1* | 5/2021 | Li | G09G 3/3266 | |
| 2021/0217348 A1* | 7/2021 | Liu | G09G 3/2074 | |
| 2021/0241672 A1* | 8/2021 | Gao | G09G 3/3233 | |

(Continued)

FOREIGN PATENT DOCUMENTS

| | | |
|---|---|---|
| CN | 1975846 A | 6/2007 |
| CN | 106448565 A | 2/2017 |

(Continued)

*Primary Examiner* — Patrick N Edouard
*Assistant Examiner* — Peijie Shen
(74) *Attorney, Agent, or Firm* — Anova Law Group, PLLC

(57) ABSTRACT

A display panel and a display device are provided. The display panel includes pixel row groups, scanning driving circuits, first data lines and second data lines. One pixel row group includes first pixel rows and one pixel row includes a first pixel and a second pixel. A luminous efficiency of color light of the first pixel is lower than a luminous efficiency of color light of the second pixel. One scanning driving circuit includes a first sub scanning driving circuit and a second sub scanning driving circuit. In at least one image frame, a duration during which the first pixel is connected to the first data line for transmitting data voltage controlled by the first sub scanning driving circuit is larger than a duration during which the second pixel is connected to the second data line for transmitting data voltage controlled by the second sub scanning driving circuit.

14 Claims, 17 Drawing Sheets

(56) References Cited

U.S. PATENT DOCUMENTS

| | | | | |
|---|---|---|---|---|
| 2021/0335213 | A1* | 10/2021 | Cong | G09G 3/2081 |
| 2022/0005403 | A1* | 1/2022 | Yue | G09G 3/3233 |
| 2022/0351663 | A1* | 11/2022 | Dai | G09G 3/2003 |
| 2023/0267882 | A1* | 8/2023 | Yang | G09G 3/3233 |
| 2023/0306901 | A1* | 9/2023 | Zhai | G09G 3/32 |
| 2023/0335058 | A1* | 10/2023 | Cho | G09G 3/3258 |

FOREIGN PATENT DOCUMENTS

| | | | |
|---|---|---|---|
| CN | 108831392 | A | 11/2018 |
| CN | 108847179 | A | 11/2018 |
| CN | 110060649 | A | 7/2019 |
| CN | 111179836 | A | 5/2020 |

* cited by examiner

DISPLAY PANEL AND DISPLAY DEVICE

CROSS-REFERENCE TO RELATED APPLICATION

This application claims the priority of Chinese Patent Application No. 202210755110.3, filed on Jun. 30, 2022, the content of which is incorporated herein by reference in its entirety.

TECHNICAL FIELD

The present disclosure generally relates to the field of display technologies and, more particularly, relates to a display panel and a display device.

BACKGROUND

With continuous improvement of display technologies, people's requirements for display devices are also increasing. Among various display technologies, self-luminous display devices have advantages of self-luminous, thin, low power consumption, high contrast, high color gamut, and flexible display, and have been widely used in various electronic devices such as computers or mobile phones. A self-luminous element in existing self-luminous display devices is generally an organic light-emitting diode (OLED), a quantum dot light-emitting diode (QLED), or a micro light-emitting diode (Micro LED). When actually displaying, the light-emitting element is generally driven to emit light by a driving current output from a pixel driving circuit, such that the display device achieves the purpose of screen display. However, the display effect of the existing display device needs to be improved.

SUMMARY

One aspect of the present disclosure provides a display panel. The display panel includes a first pixel row group to an N-th pixel row group, a first scanning driving circuit to an N-th scanning driving circuit, first data lines and second data lines. An i-th pixel row group includes a first pixel row to an M-th pixel row, and a j-th pixel row includes a first pixel and a second pixel. A luminous efficiency of corresponding color light of the first pixel is lower than a luminous efficiency of corresponding color light of the second pixel. An i-th scanning driving circuit includes a first sub scanning driving circuit electrically connected to all first pixels in the i-th pixel row group, and a second sub scanning driving circuit electrically connected to all second pixels in the i-th pixel row group. The first data lines are electrically connected to the first pixels in the i-th pixel row group, and the second data lines electrically connected to the second pixels in the i-th pixel row group. Different first pixels are electrically connected to different first data lines; and different second pixels are electrically connected to different second data line. In at least one image frame, a duration during which one first pixel is connected to one corresponding first data line for transmitting data voltage controlled by one corresponding first sub scanning driving circuit is larger than a duration during which one second pixel is connected to one corresponding second data line for transmitting data voltage controlled by one corresponding second sub scanning driving circuit.

Another aspect of the present disclosure provides a display device. The display device includes a display panel. The display panel includes a first pixel row group to an N-th pixel row group, a first scanning driving circuit to an N-th scanning driving circuit, first data lines and second data lines. An i-th pixel row group includes a first pixel row to an M-th pixel row, and a j-th pixel row includes a first pixel and a second pixel. A luminous efficiency of corresponding color light of the first pixel is lower than a luminous efficiency of corresponding color light of the second pixel. An i-th scanning driving circuit includes a first sub scanning driving circuit electrically connected to all first pixels in the i-th pixel row group, and a second sub scanning driving circuit electrically connected to all second pixels in the i-th pixel row group. The first data lines are electrically connected to the first pixels in the i-th pixel row group, and the second data lines electrically connected to the second pixels in the i-th pixel row group. Different first pixels are electrically connected to different first data lines; and different second pixels are electrically connected to different second data line. In at least one image frame, a duration during which one first pixel is connected to one corresponding first data line for transmitting data voltage controlled by one corresponding first sub scanning driving circuit is larger than a duration during which one second pixel is connected to one corresponding second data line for transmitting data voltage controlled by one corresponding second sub scanning driving circuit.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
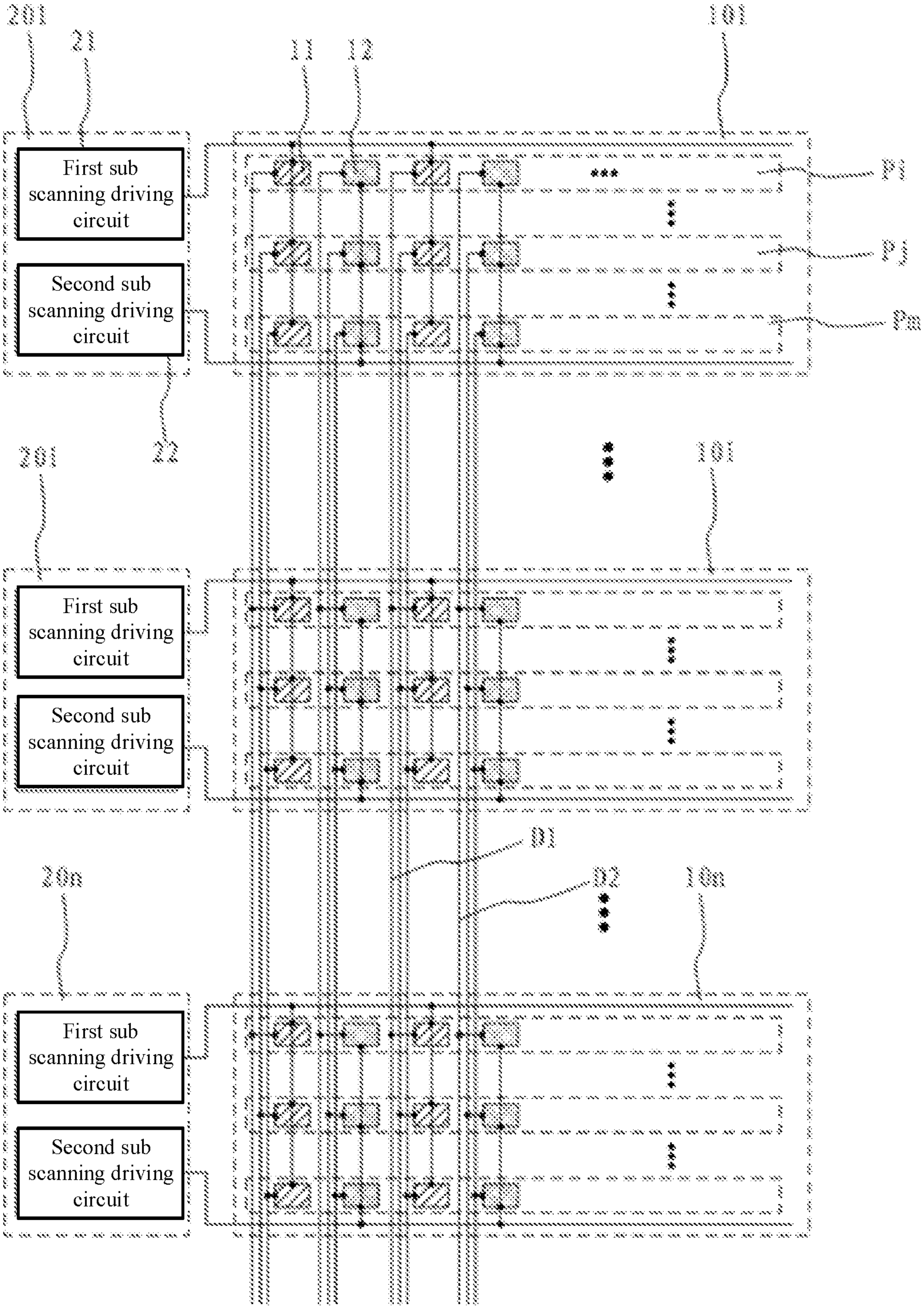
FIG. 1 illustrates an exemplary display panel consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

A self-luminous element in existing self-luminous display devices is generally an organic light-emitting diode, a quantum dot light-emitting diode, or a micro-light-emitting diode. When actually displaying, the light-emitting element is generally driven to emit light by a driving current output from a pixel driving circuit, such that the display device achieves the purpose of screen display. The luminous efficiency of light of different colors is different. Therefore, when the existing pixel driving circuit uses a same timing to drive light-emitting elements of different colors, pixels of different colors may have uneven brightness and smear color cast when they emit light, such that the display effect of the existing display device needs to be improved.

The present disclosure provides a display panel and display device to at least partially alleviate the above problem and improve the display effect of the display device.

Figure 2:
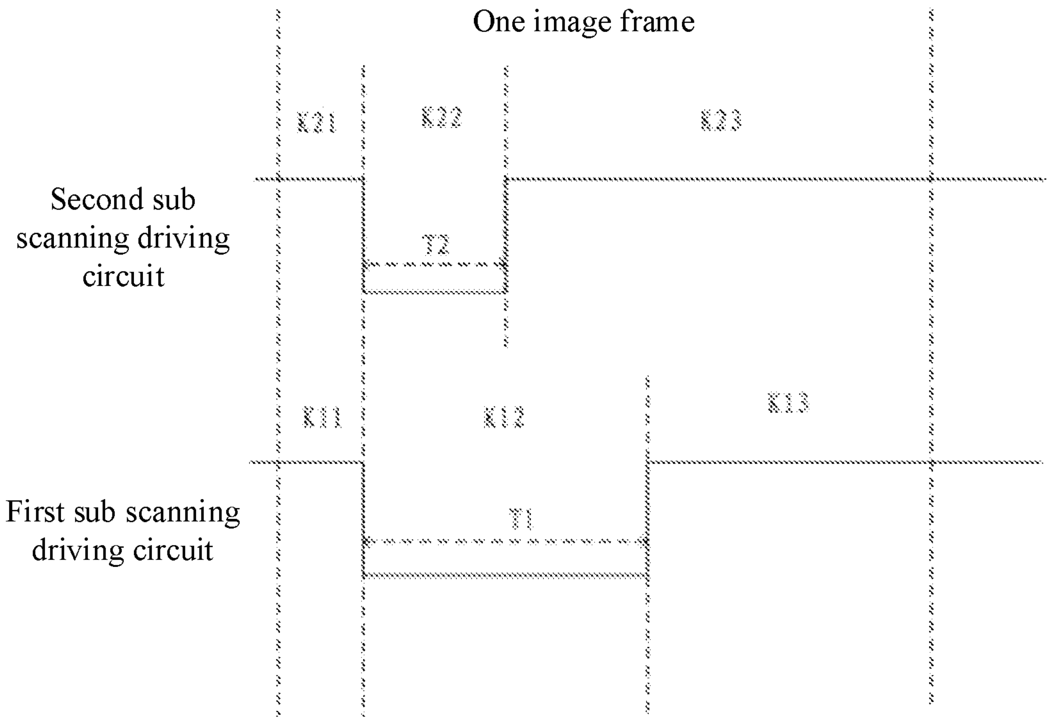
FIG. 2 illustrates an exemplary timing diagram consistent with various disclosed embodiments in the present disclosure.

One aspect of the present disclosure provides a display panel. FIG. 1 illustrates an exemplary display panel consistent with various disclosed embodiments in the present disclosure. FIG. 2 illustrates an exemplary timing diagram consistent with various disclosed embodiments in the present disclosure. In one embodiment, the display panel may include: a plurality of pixel row groups numbered from a first pixel row group 101 to an N-th pixel row group 10*n*, a plurality of scanning driving circuits numbered from a first scanning driving circuit 201 to an N-th scanning driving circuit 20*n*, and first data lines D1 and second data lines D2.

The i-th pixel row group 10*i* may include a first pixel row P1 to an M-th pixel row Pm. The j-th pixel row Pj may include a first pixel 11 and the second pixel 12. A luminous efficiency of the corresponding color light of the first pixel 11 may be lower than the luminous efficiency of the corresponding color light of the second pixel 12. N may be an integer larger than or equal to 2, M may be an integer larger than or equal to 1, i may be a positive integer less than or equal to N, and j may be a positive integer less than or equal to M.

The i-th scanning driving circuit 20*i* may include a first sub scanning driving circuit 21 and a second sub scanning driving circuit 22. The first sub scanning driving circuit 21 in the i-th scanning driving circuit 20*i* may be electrically connected to all the first pixels 11 in the i-th pixel row group 10*i*, and the second sub scanning driving circuit 22 in the i-th scanning driving circuit 20*i* may be electrically connected to all the second pixels 12 in the i-th pixel row group 10*i*.

The first data lines D1 may be electrically connected to the first pixels 11 in the i-th pixel row group 10*i*. Different first pixels 11 may be electrically connected to the different first data lines D1 respectively. The second data lines D2 may be electrically connected to the second pixels 12 in the i-th pixel row group 10*i*. Different second pixels 12 may be electrically connected to the different second data lines D2 respectively. In at least one image frame, the time T1 during which one first pixel 11 is connect to one corresponding first data line D1 to transmit the data voltage controlled by one corresponding first sub scanning driving circuit 21 may be longer than the time T2 during which one second pixel 12 is connect to one corresponding second data line D2 to transmit the data voltage controlled by one corresponding second sub scanning driving circuit 22.

In one embodiment, the first pixels 11 may be green light pixels, and the second pixels 12 may include red light pixels and/or blue light pixels.

In the present disclosure, in the display device, the luminous efficiency of the corresponding color light of the first pixels may be lower than the luminous efficiency of the corresponding color light of the second pixels. Correspondingly, in at least one image frame displayed by the display device, the time during which one first pixel is connect to one corresponding first data line to transmit the data voltage controlled by one corresponding first sub scanning driving circuit may be configured to be longer than the time during which one second pixel is connected to one corresponding second data line to transmit the data voltage controlled by one corresponding second sub scanning driving circuit, therefore compensating the light-emitting brightness of the first pixel. The light-emitting brightness of the first pixel may be ensured to be high, and the uniformity of the light-emitting brightness of the first pixel and the second pixel may be improved. Problems such as smear or color cast of the display device may be avoided, and the display effect of the display device may be improved.

In the present disclosure, for the first pixels and second pixels, each pixel may be provided with a pixel driving circuit. One pixel driving circuit may be electrically connected to a corresponding light-emitting device, and may be configured to output driving signals to control the timing of turning on or turning off the light-emitting device. In the present disclosure, when one sub scanning driving circuit is electrically connected to one corresponding pixel, the sub scanning driving circuit may be actually electrically connected to the pixel driving circuit of the corresponding pixel, to transmit control signals of the pixel driving circuit and then control the pixel driving circuit to output driving signals for controlling one corresponding light-emitting device according to a preset timing. The present disclosure has no limit on a circuit structure of the pixel driving circuit.

When one sub scanning driving circuit controls one corresponding pixel driving circuit to work, the process for one image frame may include controlling the pixel driving circuit to perform the reset stage, the data voltage writing stage and the light-emitting stage in sequence. That is, the sub scanning driving circuit may control the pixel driving circuit to complete the above three stages. The sub scanning driving circuit may control the corresponding pixel to be connected to one corresponding data line for transmitting voltage in the data writing stage. As shown in FIG. 2 which is a timing diagram of one image frame, using a low enable signal that the sub scanning driving circuit uses to controls the pixel to write data voltage as an example, one first sub scanning driving circuit 21 may control one corresponding first pixel 11 to complete the reset stage K11, the data writing stage K12 and the light emitting stage K13, and one second sub scanning driving circuit 22 may control one corresponding second pixel to complete the reset stage K21, the data writing stage K22 and the light emitting stage K23 in sequence. In the data writing stages K11 and K22, the time T1 during which one first pixel 11 is connect to one corresponding first data line D1 to transmit the data voltage controlled by one corresponding first sub scanning driving circuit 21 may be longer than the time T2 during which one second pixel 12 is connected to one corresponding second data line D2 to transmit the data voltage controlled by one corresponding second sub scanning driving circuit 22. Correspondingly, the first pixel 11 may be charged with a longer data voltage through the first data line D1, to improve the light emission of the first pixel 11 and the overall uniformity of the light emitted by the display device.

In one embodiment, the at least one image frame may include the first image frame when the display panel is powered on, to improve the brightness of the first pixel in the first image frame and avoid smearing when the display panel is turned on. Problems such as smear or color cast of the display device may be avoided, and the display effect of the display device may be improved. Optionally, in some embodiments, the at least one image frame may only include the first image frame, which is not specifically limited by the present disclosure.

As shown in FIG. 1, in the scanning driving circuits, one first sub scanning driving circuits 21 and one second sub scanning driving circuits 22 may respectively scan the pixels that are electrically connected to them. Therefore, all the first sub scanning driving circuits 21 in the first scanning driving circuit 201 to the N-th scanning driving circuit 20*n* may scan the first pixels 11 in all pixel row groups in a cascaded manner, and all the second sub scanning driving circuits 22 in the first scanning driving circuit 201 to the Nth scanning driving circuit 20*n* may scan the second pixels 12 in all pixel row groups in a cascaded manner. The first sub scanning driving circuits 21 and the second sub scanning driving circuits 22 may be respectively connected to their corresponding start signals, and scan the first pixels 11 and the second pixels in all pixel row groups in a cascaded manner.

In each pixel row group, all the first pixels 11 may be scanned at the same time, and all the second pixels 12 may be scanned at the same time. Therefore, the first data lines D1 electrically connected to different first pixels 11 may be different, and the second data lines D2 electrically connected to different second pixels 12 may be different, to avoid the occurrence of light output errors caused by the first pixel 11 and the second pixel 12 being connected to data voltages unrelated to themselves. Further, since different pixel row groups are scanned in a cascaded manner, the first pixels 11 of different pixel row groups may be electrically connected to one same first data line D1, and the second pixels 12 of different pixel row groups may also be electrically connected to one same second data line D2, therefore reducing the number of data lines. Resources may be reduced, and the effective wiring area of the display device may be ensured to be large.

Figure 3:
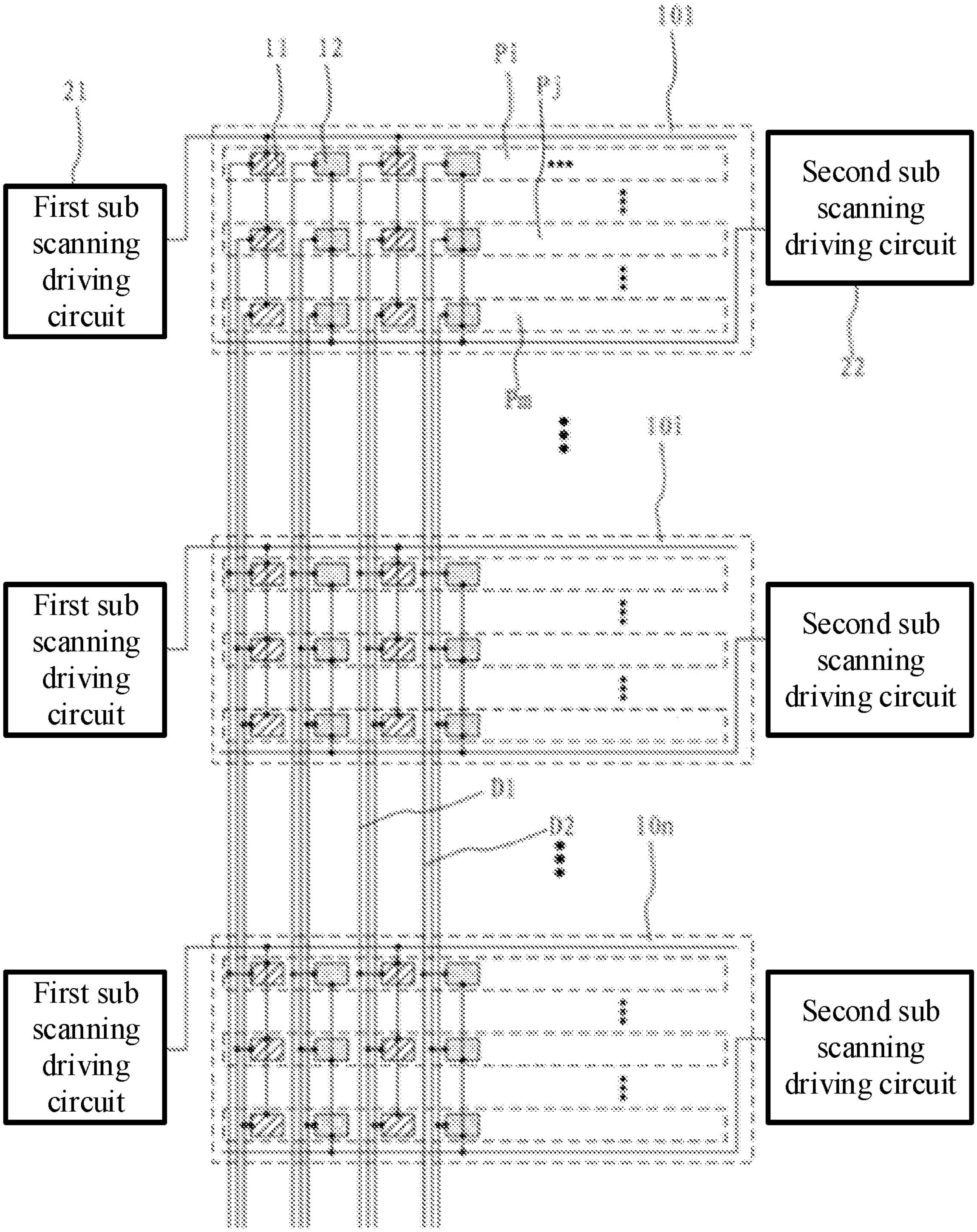
FIG. 3 illustrates another exemplary display panel consistent with various disclosed embodiments in the present disclosure.

In one embodiment, both the first sub scanning driving circuits 21 and the second sub scanning driving circuits 22 may be located on the same side of the pixel rows, as shown in FIG. 1, to be applicable to some types of display devices. Alternatively, in another embodiment shown in FIG. 3 which is a schematic structural diagram of another display panel, the first sub scanning driving circuits 21 and the second sub scanning driving circuits 22 may be located on two sides of the pixel rows respectively, to reduce the space pressure when wiring on one side of the pixel rows and ensure that the wiring areas on both sides of the pixel rows are small and the frame width of the display device is reduced.

Figure 4:
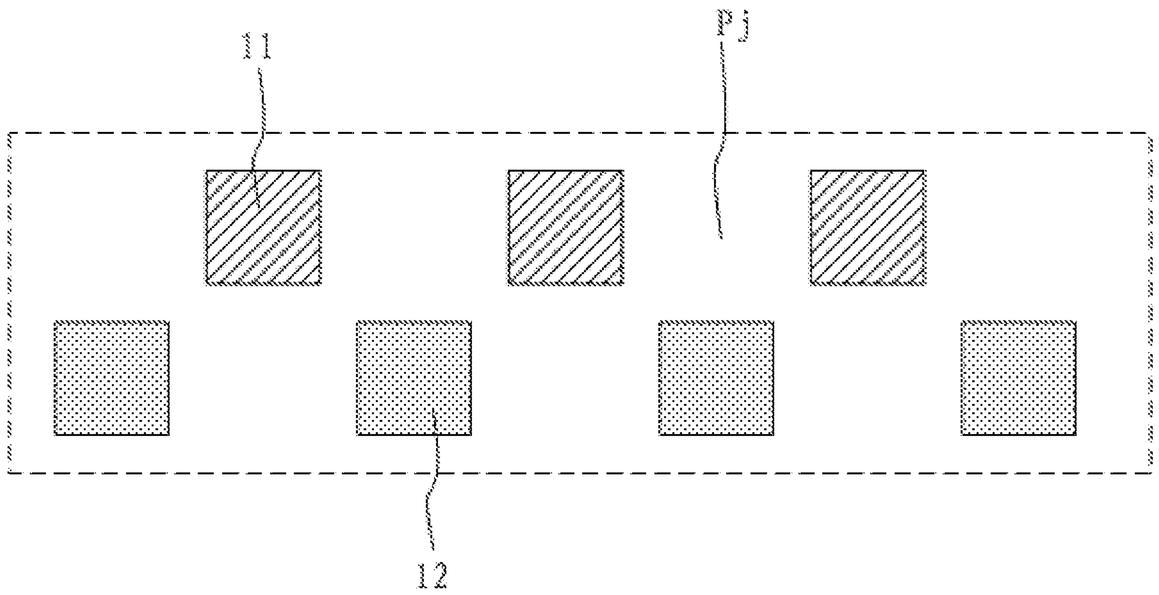
FIG. 4 illustrates an exemplary pixel row consistent with various disclosed embodiments in the present disclosure.

In any pixel row, all the first pixels 11 and the second pixels 12 may be sequentially arranged along the same straight line. As shown in FIG. 1, the first pixels 11 and the second pixels 12 may be arranged along the same straight line. Alternatively, in some other embodiments, the first pixels 11 and the second pixels 12 in one pixel row may be arranged in a regular or irregular manner such as multiple sub-rows. For example, in one embodiment in FIG. 4 which is a structural view of the j-th pixel row, the first pixels 11 and the second pixels 12 in the j-th pixel row may be arranged in two rows, all the first pixels 11 may be arranged along a straight line, and all the second pixels 12 may be arranged along another straight line. The present disclosure has no limit on the arrangement of the pixels which may be specifically designed according to the pixel arrangement type of the display device.

In one embodiment, the time length difference of the pixel drive circuits in the data writing stage through the sub-pixel drive circuits may be used to achieve the purpose of controlling the time length difference of the first pixels and the second pixels connecting to the data voltage. Alternatively, in another embodiment, the first sub scanning driving circuits and the second sub scanning driving circuits may control the respective corresponding pixel driving circuits to have the same duration in the data writing stage, and control the time for transmitting the data voltage on the data line, to achieve the purpose of controlling the time length difference of the first pixels and the second pixels connecting to the data voltage. Specifically, in one embodiment, as shown FIG. 5 which is a schematic structural diagram of another display panel, the i-th pixel row group 10*i* may include only one pixel row P1. That is, M may be equal to 1. In the i-th scanning driving circuit 10*i*, the first sub scanning driving circuit 21 and the second sub scanning driving circuit 22 may work simultaneously and have the same output driving waveform. The display panel may further include a data control circuit 300 electrically connected to the first data lines D1 and the second data lines D2. When the first sub scanning driving circuit 21 and the second sub scanning driving circuit 21 control the respective corresponding pixels to be connected to the respective corresponding data lines, the duration T1 during which the first data line D1 is connected to the data voltage controlled by the data control circuit 300 may be longer than the duration T2 during which the second the data line D2 is connected to the data voltage controlled by the data control circuit 300.

Figure 5:
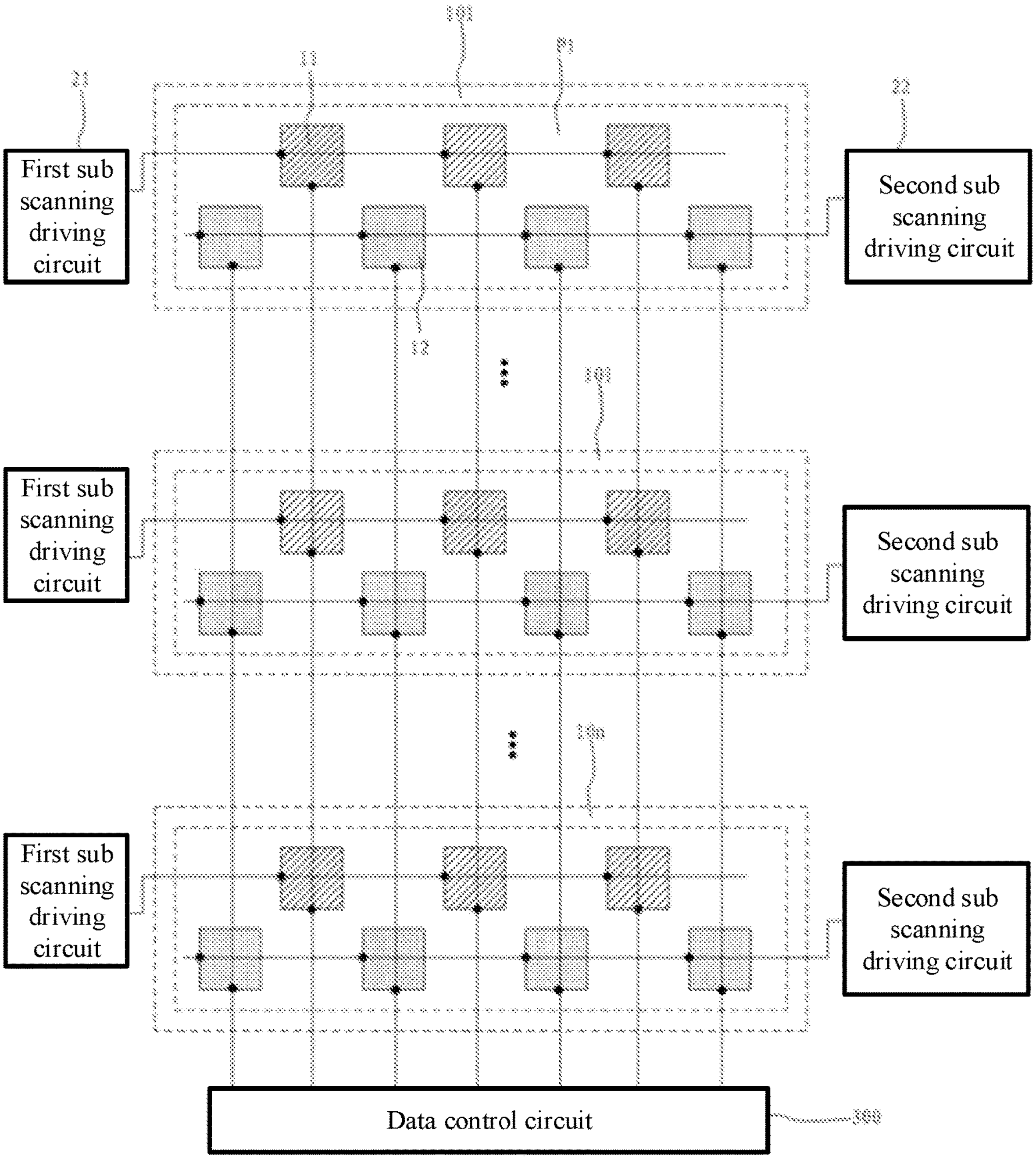
FIG. 5 illustrates another exemplary display panel consistent with various disclosed embodiments in the present disclosure.
Figure 6:
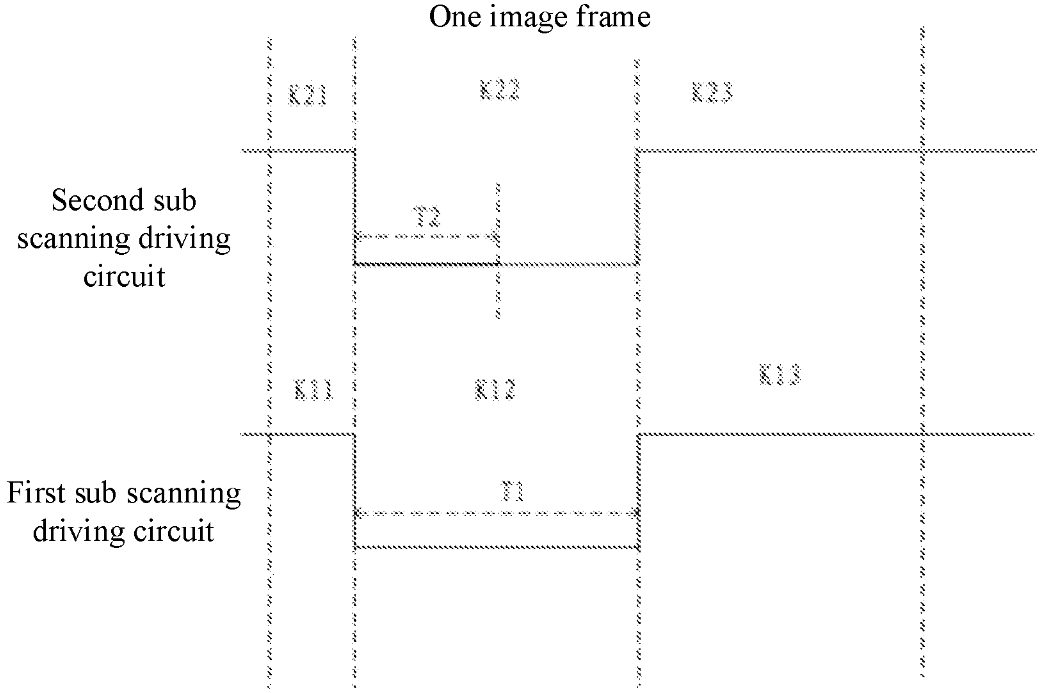
FIG. 6 illustrates another exemplary timing diagram consistent with various disclosed embodiments in the present disclosure.
Figure 7:
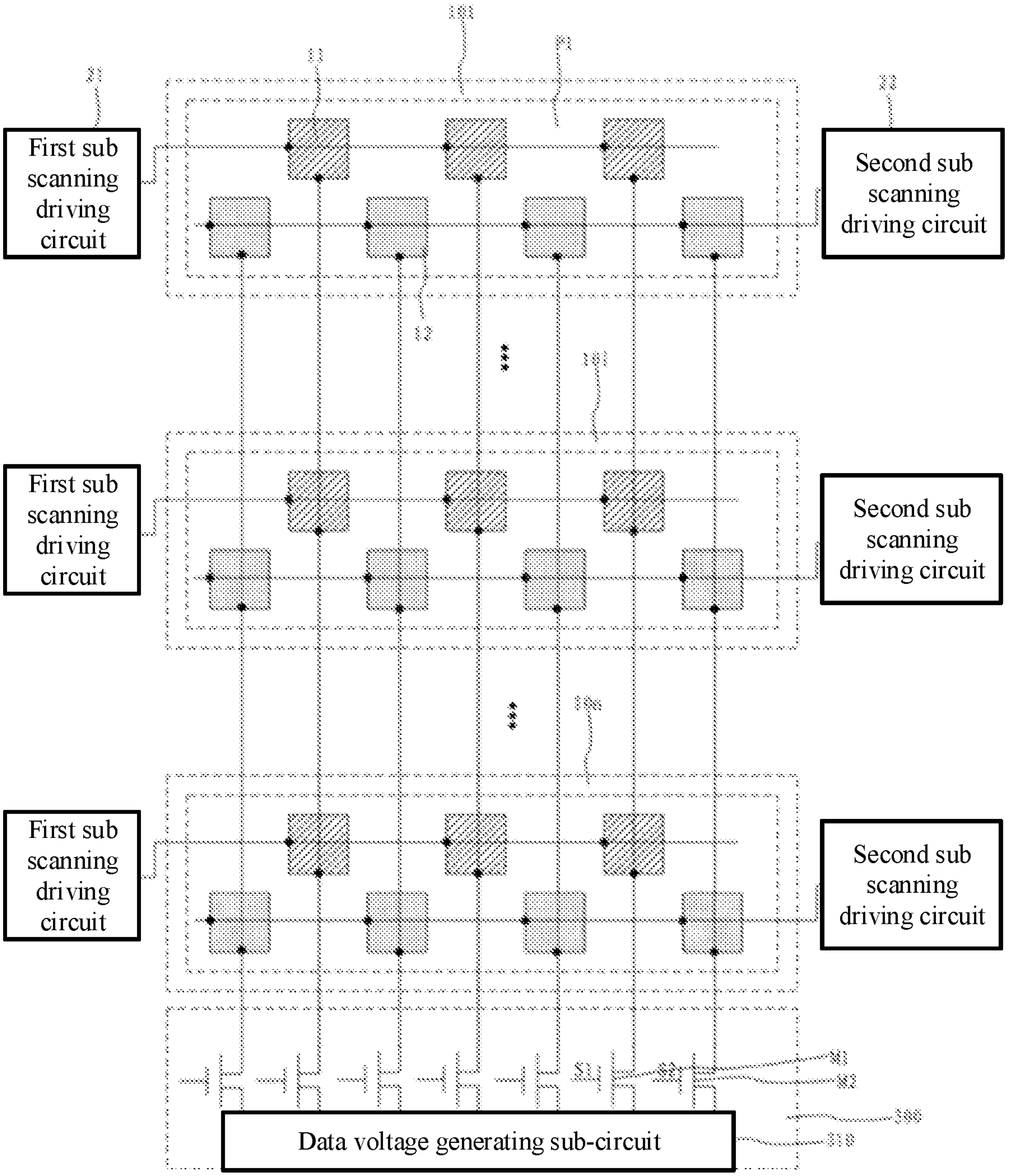
FIG. 7 illustrates another exemplary display panel consistent with various disclosed embodiments in the present disclosure.

As shown in FIG. 5 and FIG. 6 which is another timing diagram, one first sub scanning driving circuit 21 may control one corresponding pixel driving circuit to complete the reset stage K11, the data writing stage K12 and the light-emitting stage K13, and one second sub scanning driving circuit 22 may be configured to control one corresponding pixel driving circuit to complete the reset stage K21, the data writing stage K22 and the light-emitting stage K23. In one same scanning driving circuit, the waveforms and timing of the signals output by the first sub scanning driving circuit 21 and the second sub scanning driving circuit 22 may be same, such the reset stages, the data writing stages and the light-emitting stages of the operation of the corresponding pixel driving circuits controlled by the first sub scanning driving circuit 21 and the second sub scanning driving circuit 22 in one image frame may coincide. Therefore, by controlling the duration of the data lines connecting to the data voltage, the time T1 during which the first pixel 11 is connected to the data voltage may be controlled to be longer than the time T2 during which the second pixel 12 is connected to the data voltage. That is, the duration T1 during which the first data line D1 is connected to the data voltage controlled by the data control circuit 300 may be longer than the duration T2 during which the second data line D2 is connected to the data voltage controlled by the data control circuit 300, therefore compensating the light-emitting brightness of the first pixel 11 to ensure the light-emitting brightness of the first pixel 11 is higher. The uniformity of the brightness of the light emitted by the first pixels 11 and the second pixels 12 may be improved, the problems such as smear and color cast of the display device may be avoided, and the display effect of the display device may be improved.

The resolution where the duration of the data lines to transmit the voltage is controlled to achieve the control of the time difference of the duration of the first pixels and the second pixels to be connected to the data voltage is not only applicable to the scheme where only one pixel row is included in one pixel row group. In some other embodiments, when one pixel row group includes a plurality of pixel rows, that is, when M is larger than 1, in one scanning driving circuit, the first sub scanning driving circuit and the second sub scanning driving circuit may also work at the same time and have the same output driving waveform. The first data lines connected to all the first pixels in each row group may be different, and the second data lines connected to all the second pixels in each pixel row group may be different. All the first data lines and the second data line in each pixel row group may be both independent and may not be multiplexed, to prevent the multiplexed data lines from transmitting data voltages to wrong pixels when the first pixels and the second pixels in one pixel row group are scanned at the same time.

In one embodiment, based on the data control circuit for achieving the control of the duration difference of the first pixels and the second pixels being connected to the data voltage, in one scanning driving circuit, the first sub scanning driving circuit and the second sub scanning driving circuit may output same driving waveforms, while scanning the pixels one by one in terms of timing. The present disclosure has no limit on this.

In one embodiment, the data control circuit 300 may include a plurality of first switch transistors M1, a plurality of second switch transistors M2, and a data voltage generating sub-circuit 310. In one first switch transistor M1 of the plurality of first switch transistors M1, a first terminal may be electrically connected to one corresponding first data line D1, a second terminal may be electrically connected to the data voltage generating sub-circuit 310, and a control terminal may be electrically connected to a first control signal terminal S1. In one of the plurality of second switch transistors M2, a first terminal may be electrically connected to one corresponding second data line D2, a second terminal may be electrically connected to the data voltage generating sub-circuit 310, and a control terminal may be electrically connected to a second control signal terminal S2.

When the first sub scanning driving circuits 21 and the second sub scanning driving circuits 22 control the corresponding pixels to be connected to the corresponding data lines, the conduction duration of the plurality of first switch transistors M1 controlled by the first control signal terminal S1 may be larger than the conduction duration of the plurality of second switch transistors M2 controlled by the second control signal terminal S2.

The data voltage generating sub-circuit 310 may be configured to generate a data voltage suitable for each row of pixels. When one first switch transistor M1 of the plurality of first switch transistor M1 is turned on, the data voltage may be transmitted to one first data line D1 connected to the first switch transistor M1 through the first switch transistor M1. When one second switch transistor M2 of the plurality of second switch transistor M2 is turned on, the data voltage may be transmitted to one second data line D2 connected to the second switch transistor M2 through the second switch transistor M2. When one first switch M1 or one second switch M2 is turned off, it may indicate that there is no data voltage transmission in one first data line D1 connected to the first switch transistor M1 or in one second data line D2 connected to the second switch transistor M2. Correspondingly, the conduction duration of the first switching transistor M1 and the second switching transistor M2 may be controlled to control the duration of the pixels connected to the data voltage.

Figure 8:
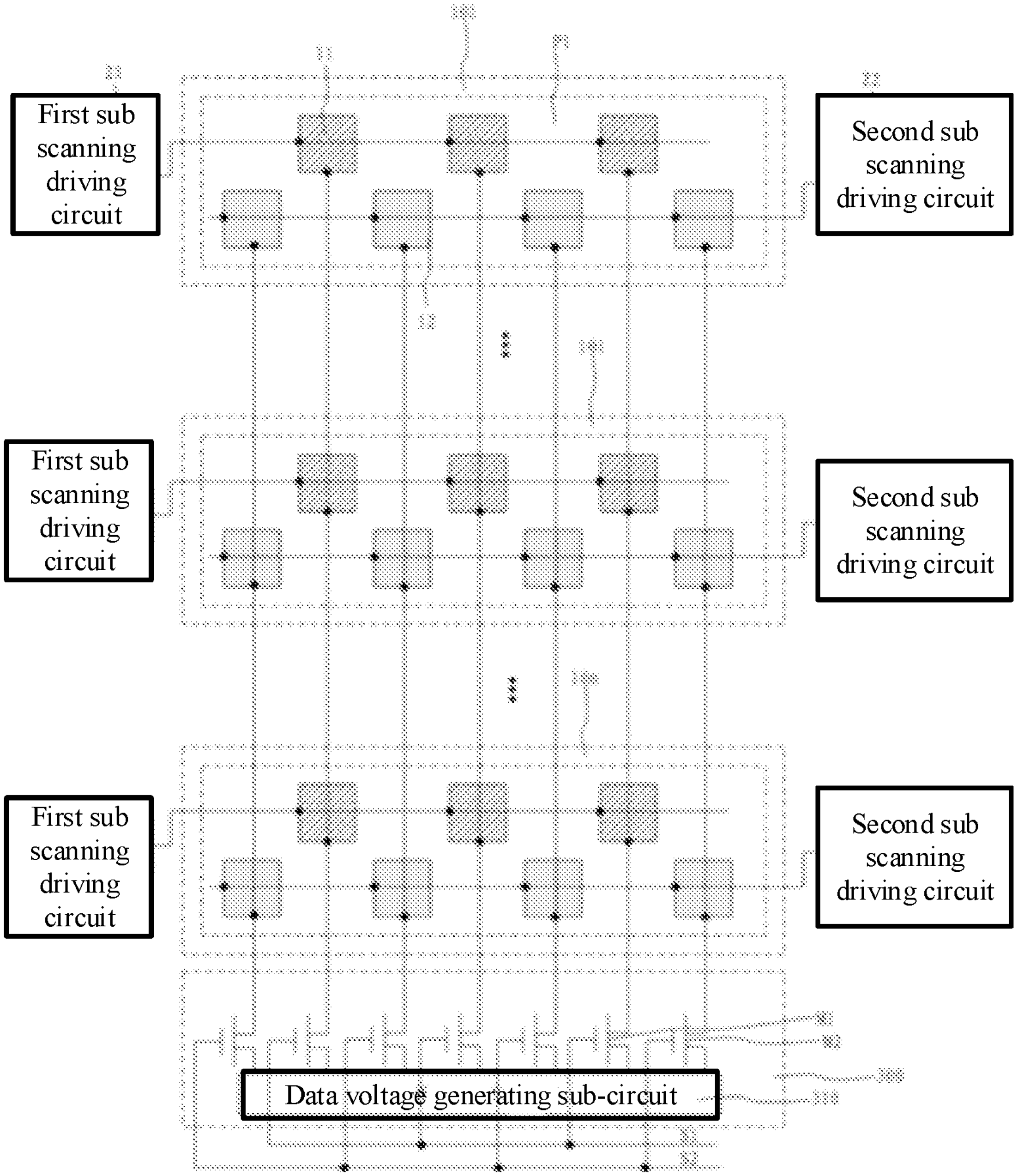
FIG. 8 illustrates another exemplary display panel consistent with various disclosed embodiments in the present disclosure.

The plurality of first switch transistors M1 and the plurality of second switch transistors M2 may be transistors, and the conduction type of any one of plurality of first switch transistors M1 and the plurality of second switch transistors M2 may be N-type or P-type. As shown in FIG. 8, in one embodiment, the conduction types of all of the plurality of first switch transistors M1 may be the same, and the number of the first control signal terminals S1 may be greatly reduced. That is, the conduction types of all of the plurality of first switch transistors M1 may be the same, and all the first control signal terminals S1 may be a same terminal. Through one first control signal terminal S1, the conduction duration of all of the plurality of first switch transistors M1 may be controlled, to control the duration of the first data line D1 to transmit the data voltage. And/or, the conduction types of all of the plurality of second switch transistors M2 may be same, and all the second control signal terminals S2 may be a same terminal, which may further reduce the number of control signal terminals and save resources.

In one embodiment, the conduction types of the plurality of first switch transistors M1 and the plurality of second switch transistors M2 may be same, to further facilitate the manufacture of switch transistors with the same conduction types on the basis of reducing the number of control signal terminals. The manufacturing process of the display device may be simplified.

It should be noted that the data control circuit may be an independently fabricated circuit or a circuit integrated in a driving chip of the display panel, which is not specifically limited by the present disclosure.

Figure 9:
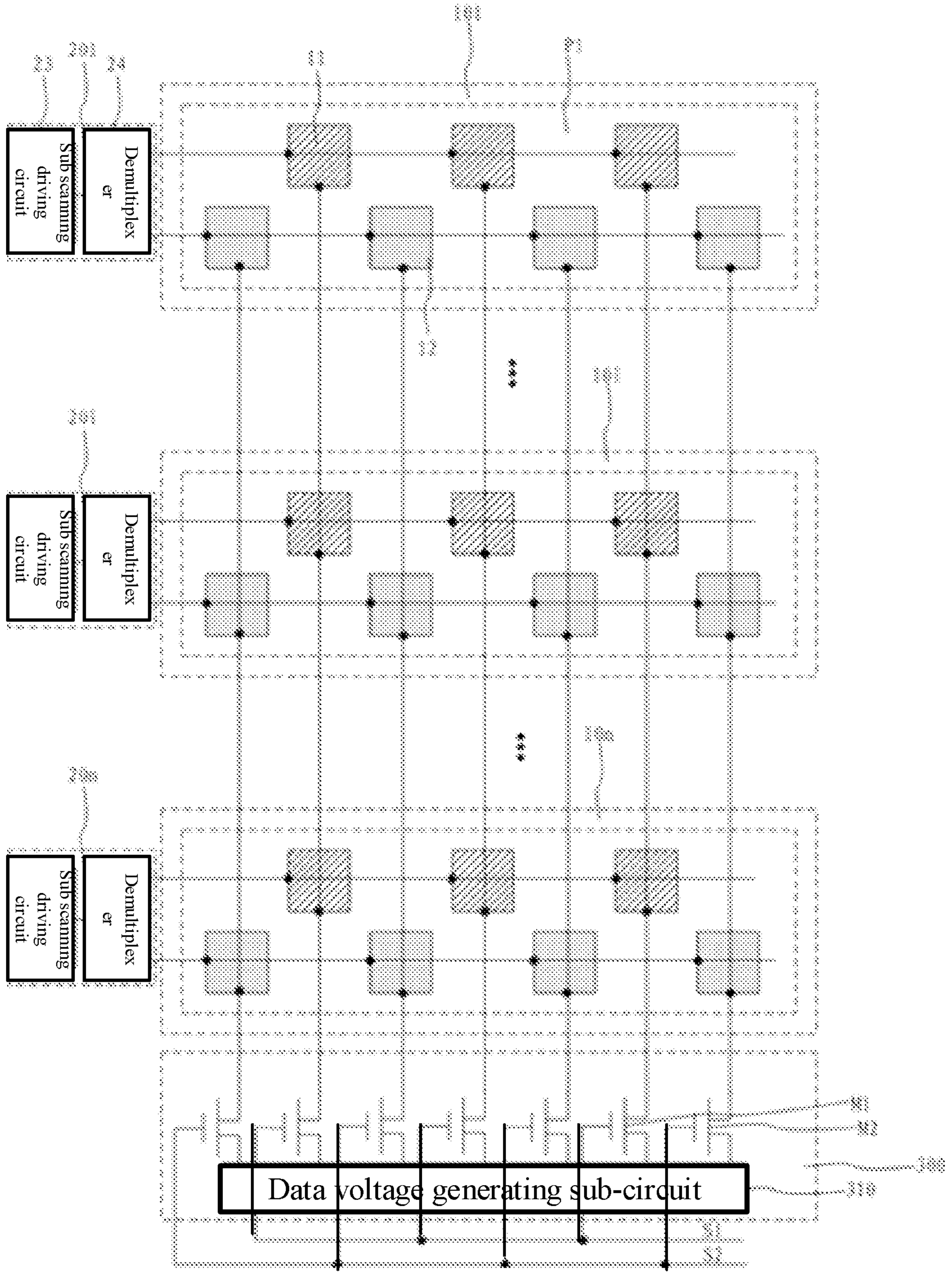
FIG. 9 illustrates another exemplary display panel consistent with various disclosed embodiments in the present disclosure.

In another embodiment shown in FIG. 9 which illustrates another display panel, in one scanning driving circuit, the first sub scanning driving circuit and the second sub scanning driving circuit may work at the same time and have the same output driving waveform. The first sub scanning driving circuit and the second sub scanning driving circuit may be one same sub scanning driving circuit 23. The i-th scanning driving circuit 20*i* may further include a demultiplexer 24. An input terminal of the demultiplexer 24 may be electrically connected to the sub scanning drive circuit 23, a first output terminal of the demultiplexer 24 may be electrically connected to all the first pixels 11 in the i-th pixel row group 10*i*, and a second output terminal of the demultiplexer 24 may be electrically connected to all the second pixels 12 in the i-th pixel row group 10*i*. The demultiplexer 24 may transmit the driving signal to the first pixels 11 and the second pixels 12, to complete the driving process of the pixels. Further, by setting the first sub scanning driving circuit and the second sub scanning driving circuit in one scanning driving circuit as the same sub scanning driving circuit 23, the area occupied by the scanning driving circuit may be reduced, ensuring that the wiring space of the display device is large.

Figure 10:
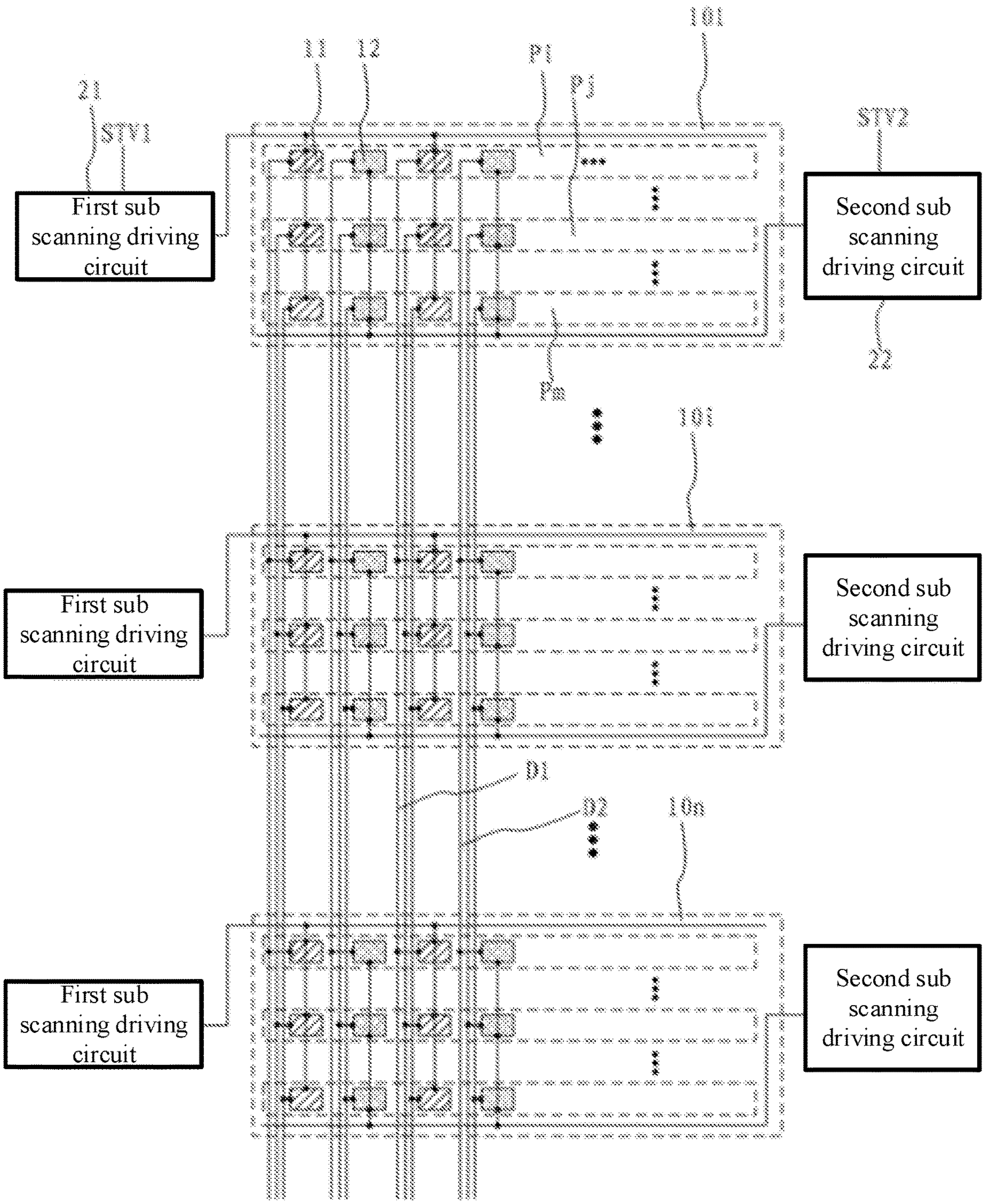
FIG. 10 illustrates another exemplary display panel consistent with various disclosed embodiments in the present disclosure.

In one embodiment shown in FIG. 10, in the i-th scanning driving circuit, the first sub scanning driving circuit 21 and the second sub scanning driving circuit 22 may be connected to the turn-on signal one by one, and in the at least one image frame, the connection duration of the first pixels 11 and the corresponding first data line D1 controlled by the first sub scanning driving circuit 21 may be longer than the connection duration of the second pixels 12 and the corresponding second data line D2 controlled by the second sub scanning driving circuit 22. The time when the first sub scanning driving circuit 21 is connected to the turn-on signal STV1 may be after the time when the second sub scanning driving circuit 22 is connected to the turn-on signal STV2, or the time when the first sub scanning driving circuit 21 is connected to the turn-on signal STV1 may be before the time when the second sub scanning driving circuit 22 is connected to the turn-on signal STV2. Since all the first sub scanning driving circuits 21 may be cascaded and all the second sub scanning driving circuits 22 may be cascaded, it may be ensured that the first sub scanning driving circuit 21 and the second sub scanning driving circuit 22 in one same scanning driving circuit are connected to the turn-on signal one by one.

Figure 11:
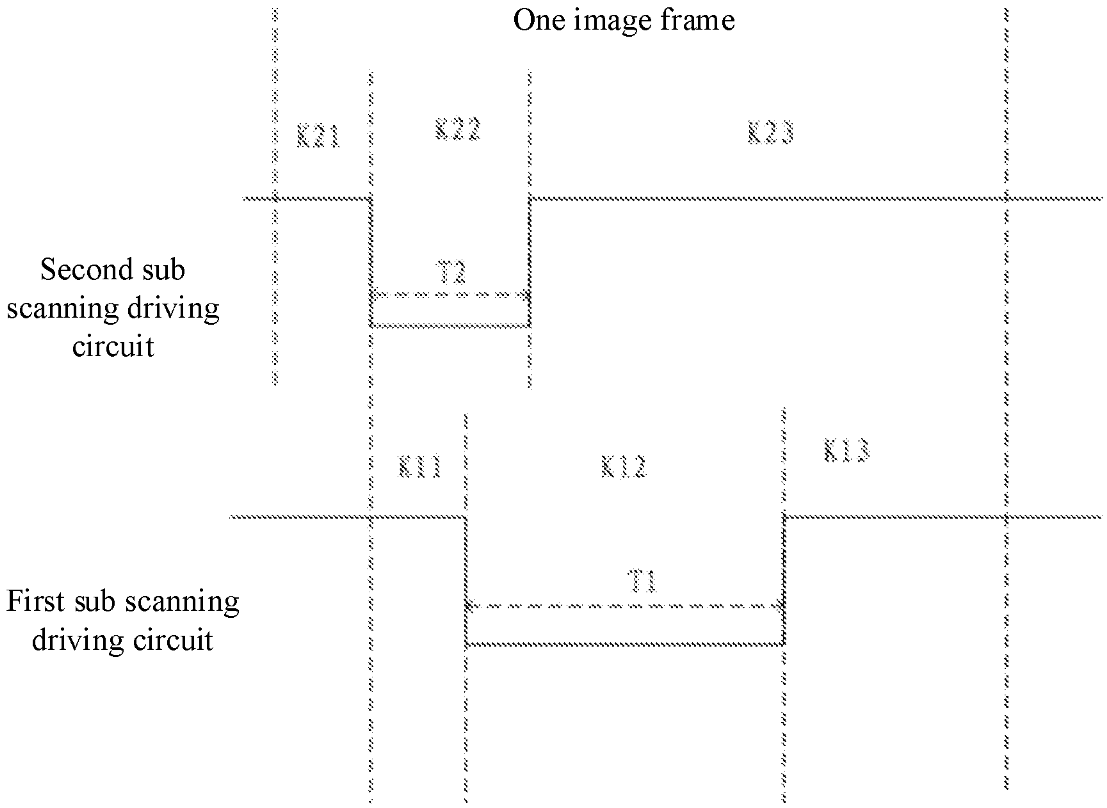
FIG. 11 illustrates another exemplary timing diagram consistent with various disclosed embodiments in the present disclosure.

In one scanning driving circuit, the first sub scanning driving circuit 21 may be connected to all the first pixels 11 in one corresponding pixel row group, and the second sub scanning driving circuit 22 may be connected to all the second pixels 12 in the corresponding pixel row group. All the first pixels 12 in each pixel row group may be scanned at the same time, and all the second pixels 12 in each pixel row group may be scanned at the same time. Therefore, when there are many pixel rows in the pixel row group, scanning all the pixels in the pixel row group at the same time may result that the frame frequency is too large. In one embodiment of the present disclosure, the first pixels 11 and the second pixels 12 in one same pixel row group may be scanned in a time-division manner, to avoid the situation that the frame frequency of the display device is too fast. As shown in FIG. 11 which is another timing diagram, the first sub scanning driving circuit 21 and the second sub scanning driving circuit 22 in one scanning driving circuit may be connected to the turn-on signal one by one, and there may be a time difference between the time when the first scanning driving circuit 21 controls the corresponding pixel driving circuit to enter the reset stage K11 and the time when the second sub-drive circuit 22 controls the corresponding pixel driving circuit to enter the reset stage K21.

Figure 12:
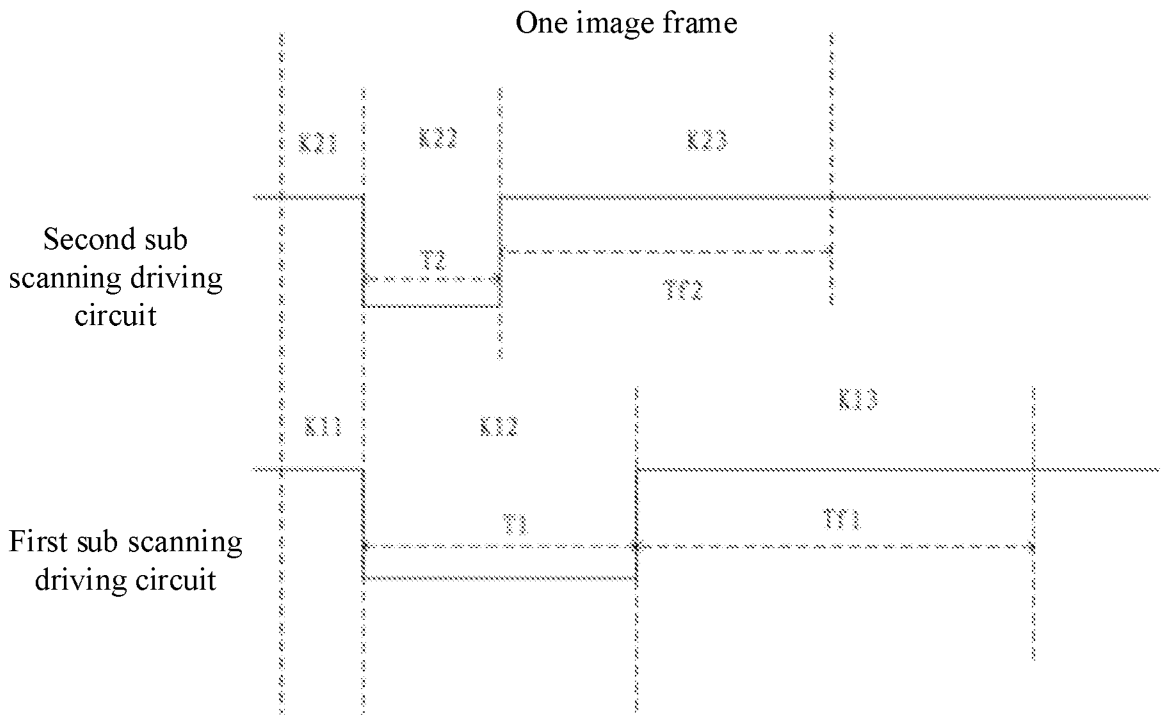
FIG. 12 illustrates another exemplary timing diagram consistent with various disclosed embodiments in the present disclosure.

Further, in some embodiments, the light-emitting time of the pixels may be controlled by the sub-pixel driving circuits, to enhance the light-emitting brightness of the first pixels. As shown in FIG. 12 which is another timing diagram, in the at least one image frame, the light-emitting duration Kf1 of the first pixels 11 controlled by the corresponding first sub scanning driving circuit 21 may be longer than the light-emitting duration Kf2 of the second pixels 12 controlled by the second sub scanning driving circuit 22, to improve the light-emitting brightness of the first pixels 11. The light-emitting brightness uniformity of the first pixels 11 and the second pixels 12 and the display effect of the display device may be improved.

Figure 13:
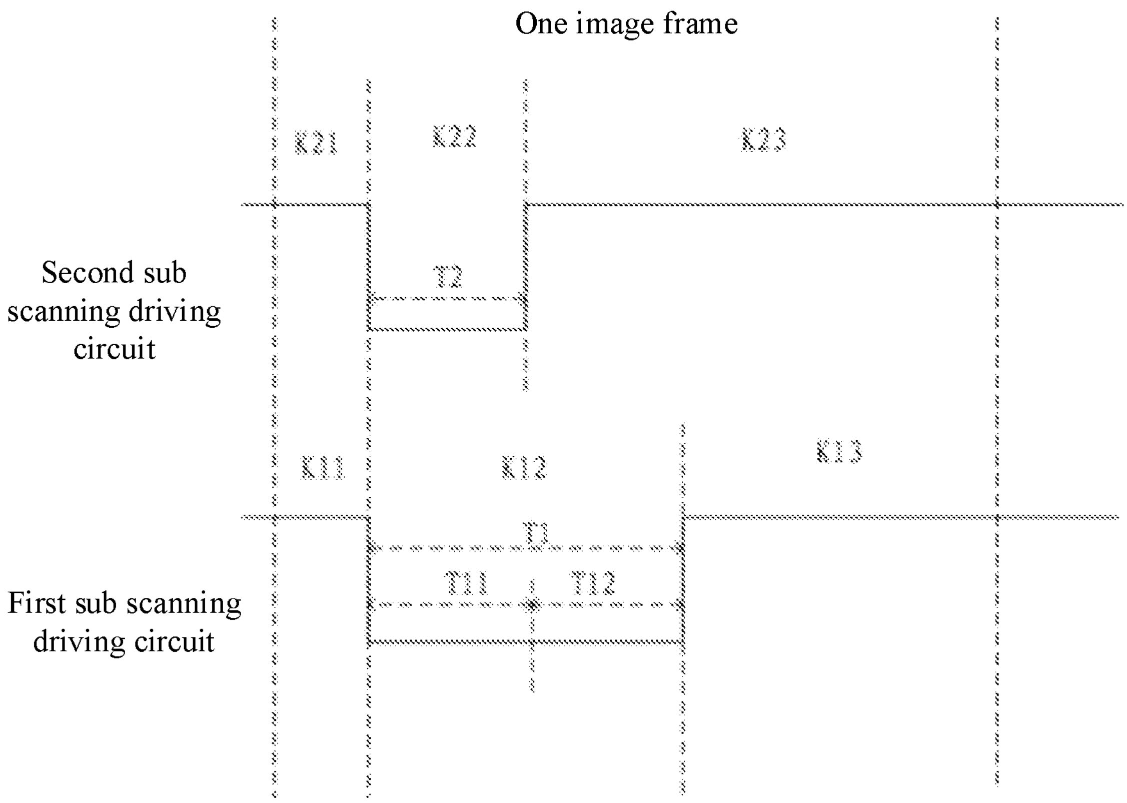
FIG. 13 illustrates another exemplary timing diagram consistent with various disclosed embodiments in the present disclosure.

As shown in FIG. 13 which is another timing diagram, in another embodiment, in the at least one image frame, the connection duration of the first pixels 11 and the corresponding first data lines D1 may include a first duration T11 and a second duration T12. The first duration T11 and the second duration T12 may be two consecutive durations, to ensure the continuity and the effect of the first pixels connected to the data voltage.

Figure 14:
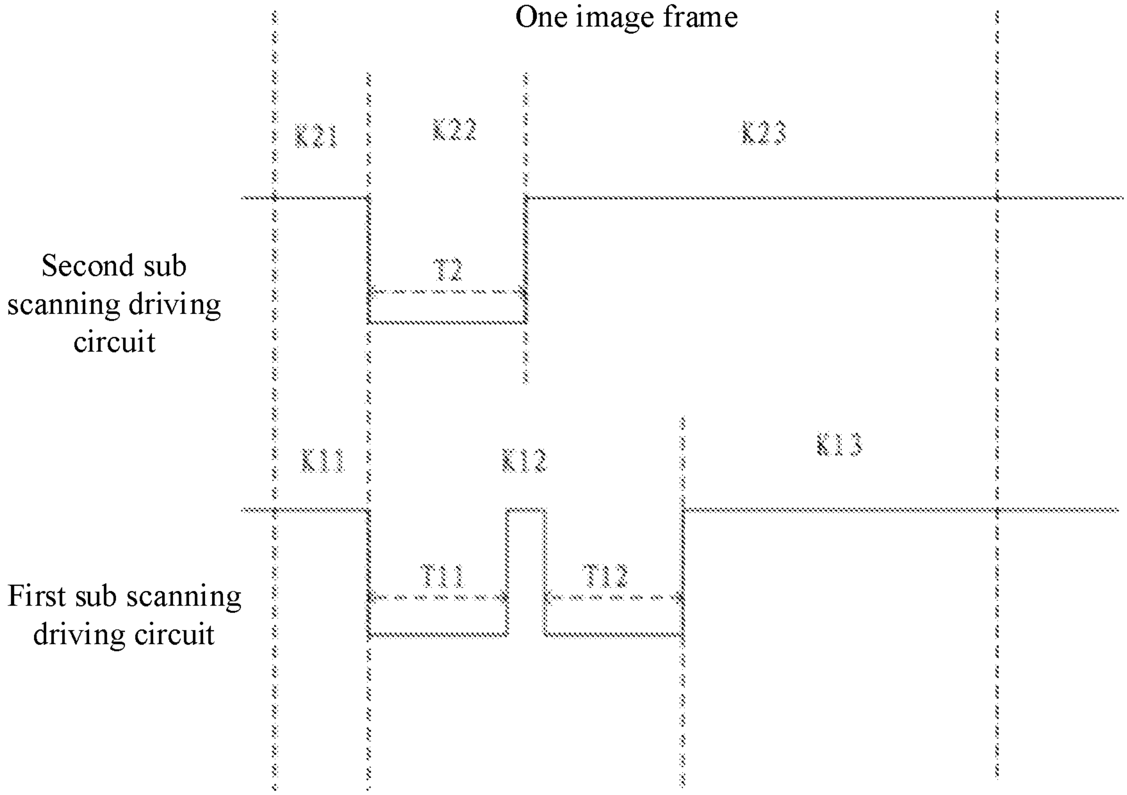
FIG. 14 illustrates another exemplary timing diagram consistent with various disclosed embodiments in the present disclosure.

Alternatively, in another embodiment, as shown in FIG. 14 which is another timing diagram, in the at least one image frame, the connection duration of the first pixels 11 and the corresponding first data lines D1 may include a first duration T11 and a second duration T12. The first duration T11 and the second duration T12 may be two non-consecutive durations, such that writing the data voltage to the first pixels 11 may be performed in sections, which may expand the way of data writing, and further expand the applicable scene of the display device.

It should be noted that the present disclosure does not specifically limit the magnitude relationship between the first period T11 and the second period T12, which may be specifically designed according to actual applications.

Figure 15:
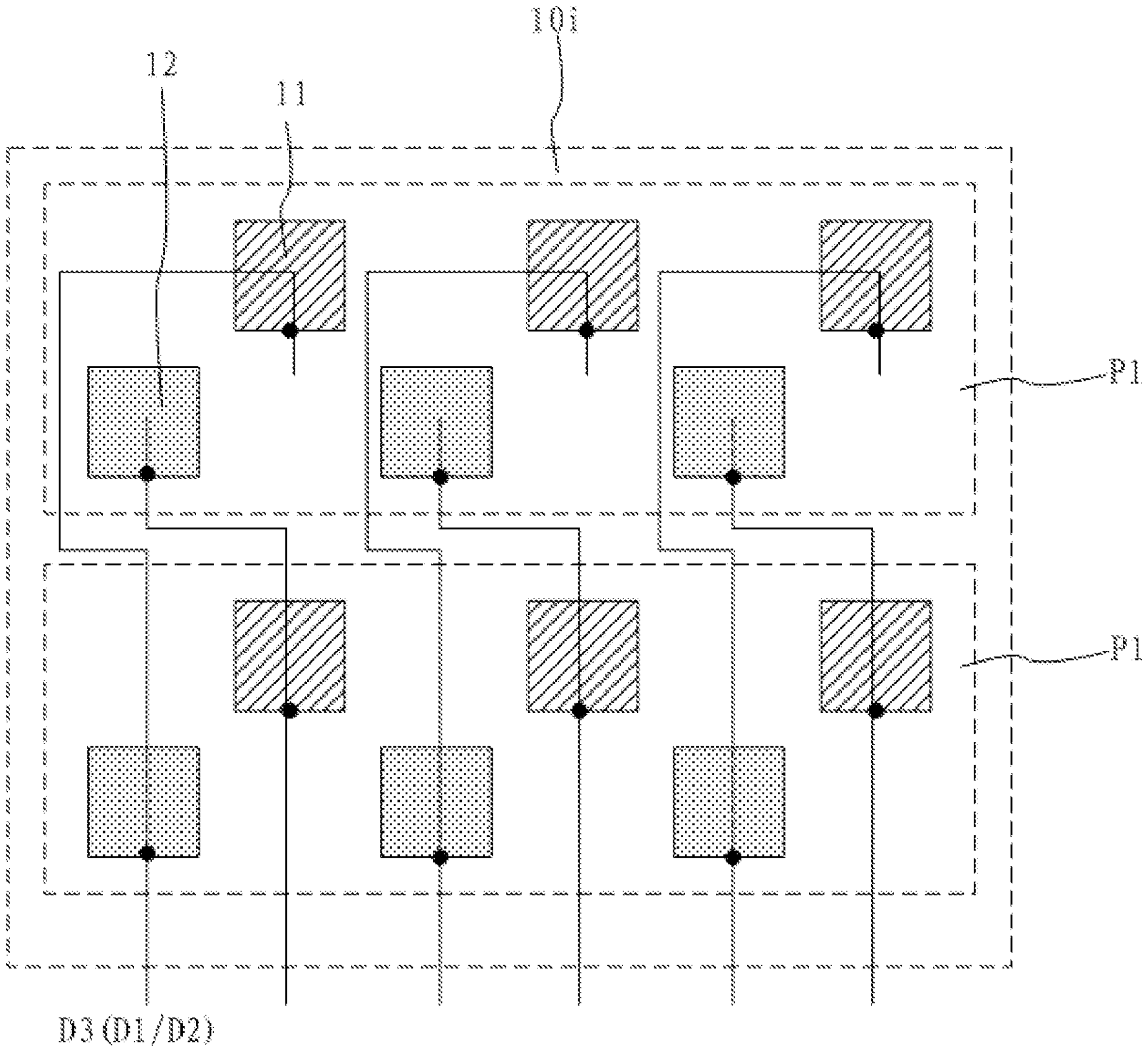
FIG. 15 illustrates an exemplary pixel row group consistent with various disclosed embodiments in the present disclosure.

FIG. 15 shows an exemplary pixel row group. As shown in FIG. 15, when M is larger than or equal to 2 (the embodiment in FIG. 15 where M is 2 is used as an example for illustration), in the data lines corresponding to the i-th pixel row group 10*i*, at least a pair of the first data line D1 and the second data line D2 may be one same data line D3. That is, the first sub scanning driving circuit 21 and the second sub scanning driving circuit 22 in one scanning driving circuit may be connected to the turn-on signal one by one, and the first pixels 11 and the second pixels 12 in one same pixel row group may be scanned at different times. At this time, the data lines respectively connected to the paired first pixels 11 and the second pixels 12 may be set as the same data line D3, and the data line D3 may transmit the corresponding data voltage to the first pixels 11 when the first pixels 11 are scanned, and may also transmit the data voltage to the second pixels 12 when the second pixels 12 are scanned. On the basis that the data line D3 is able to accurately transmit the data voltage to the corresponding pixels, the number of data lines may be reduced.

Figure 16:
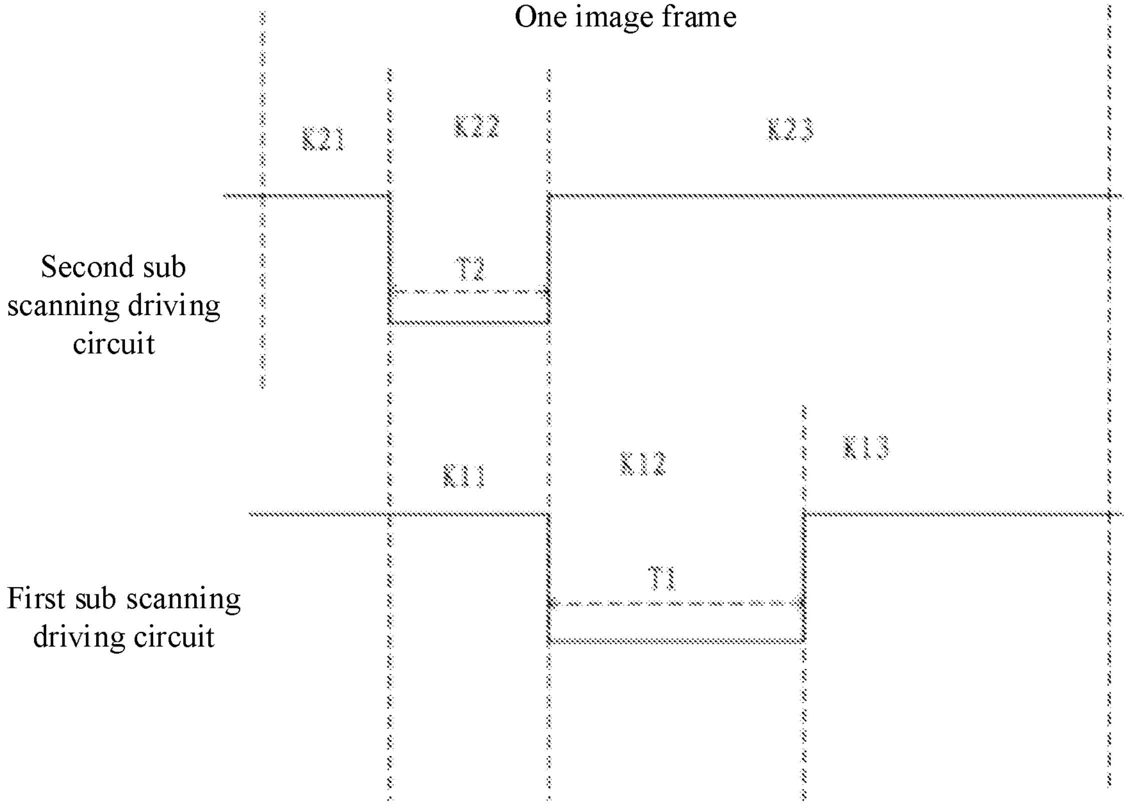
FIG. 16 illustrates another exemplary timing diagram consistent with various disclosed embodiments in the present disclosure.

It should be noted that the data line D3 may transmit the data voltage to the first pixels 11 and the second pixels 12 in a time-sharing manner. Therefore, the data writing stage K12 controlled by the first sub scanning driving circuit 21 and the data writing stage K22 controlled by the second sub scanning driving circuit 22 may not overlap in time. As shown in FIG. 16, the initial time of the data writing stage K12 controlled by the first sub-driving circuit 21 may be at or after the end time of the data writing stage K22 controlled by the second sub-driving circuit 22, thereby preventing the data line D3 transmit the data voltage that should be transmitted to the first pixels 11 (or the second pixels 12) incorrectly to the second pixels 12 (or the first pixels 11).

Figure 17:
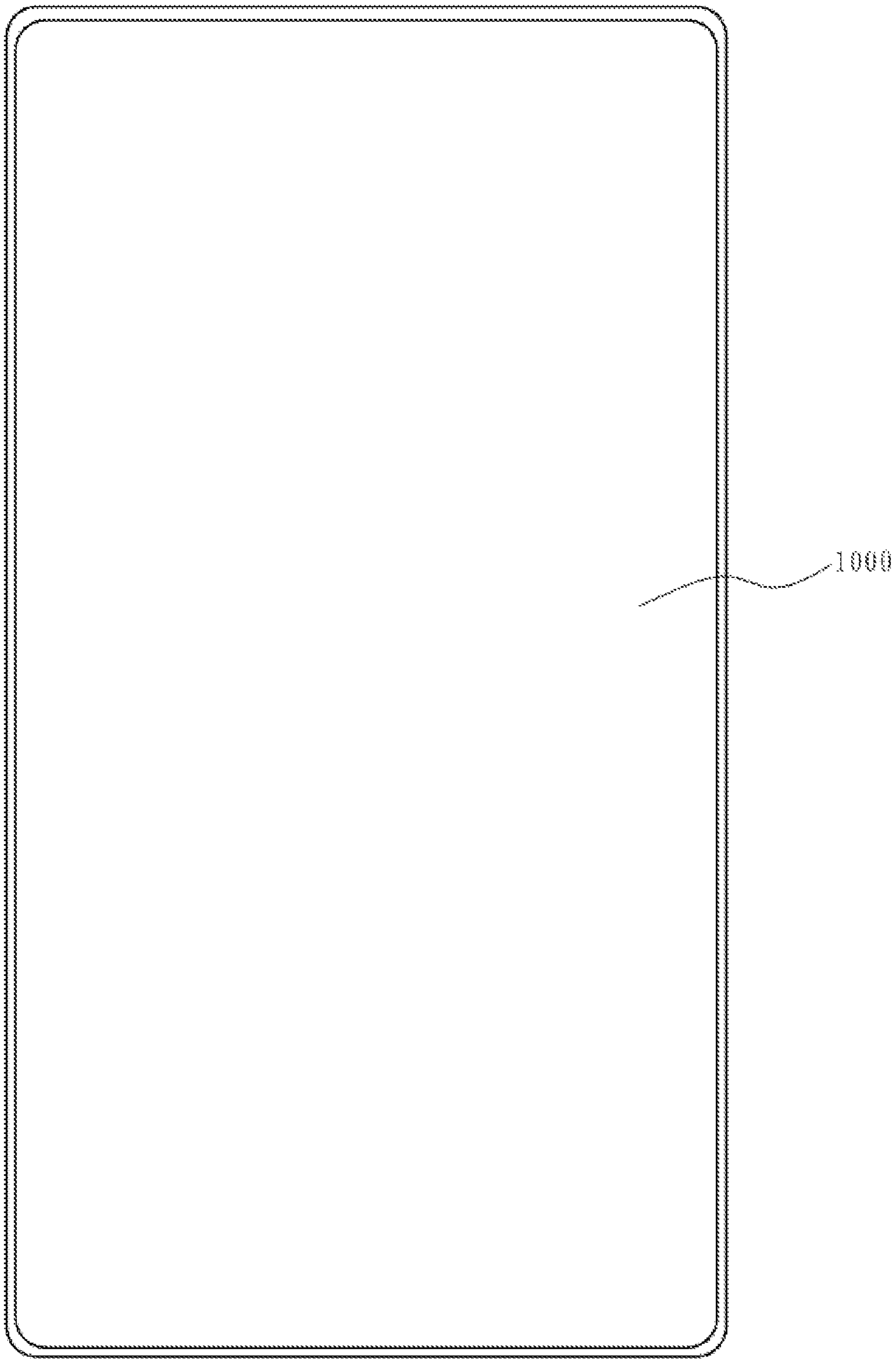
FIG. 17 illustrates an exemplary display device consistent with various disclosed embodiments in the present disclosure

The present disclosure also provides a display device. As shown in FIG. 17, in one embodiment, the display device 1000 may include any display panel provided by various embodiments of the present disclosure. In one embodiment, the display device 1000 may be a cell phone.

In other embodiments, the display device may be a notebook, a tablet, a compute, a wearable device, and so on. The present disclosure has no limit on this.

In the display panel and the display device provided by the present disclosure, in the display device, the luminous efficiency of the corresponding color light of the first pixels may be lower than the luminous efficiency of the corresponding color light of the second pixels. Correspondingly, in at least one image frame displayed by the display device, the time during which one first pixel is connect to one corresponding first data line to transmit the data voltage controlled by one corresponding first sub scanning driving circuit may be configured to be longer than the time during which one second pixel is connect to one corresponding second data line to transmit the data voltage controlled by one corresponding second sub scanning driving circuit, therefore compensating the light-emitting brightness of the first pixel. The light-emitting brightness of the first pixel may be ensured to be high, and the uniformity of the light-emitting brightness of the first pixel and the second pixel may be improved. Problems such as smear or color cast of the display device may be avoided, and the display effect of the display device may be improved.

In the present disclosure, it is to be understood that the terms "center", "longitudinal", "lateral", "length", "width", "thickness", "upper", "lower", "front", "back", "left", "right", "vertical", "horizontal", "top", "bottom", "inside", "outside", "clockwise", "counterclockwise", "axial", "radial", "circumferential", etc. indicate the orientation or positional relationship based on the orientation or positional relationship shown in the accompanying drawings, and are only for the convenience of describing the present disclosure and simplifying the description, rather than indicating or implying the indicated devices or elements must have a particular orientation, be constructed and operate in a particular orientation, and therefore should not be construed as limiting the disclosure.

In addition, the terms "first" and "second" appear for descriptive purposes only, and should not be understood as indicating or implying relative importance or implying the number of indicated technical features. Thus, a feature delimited with "first", "second" may expressly or implicitly include at least one of that feature. In the description of the present disclosure, "plurality" may mean at least two, such as two, three, etc., unless otherwise expressly and specifically defined.

In the present disclosure, unless otherwise expressly specified and limited, terms such as "installed", "connected", "connected to" and "fixed" should be understood in a broad sense. For example, it may be a fixed connection or a disassembled connection, or integrated. It may be a mechanical connection or an electrical connection, or may be a connection that is able to communicate with each other. It may be directly connected or indirectly connected through an intermediate medium. It can be the internal communication of two components or the interaction of the two components relationship, unless otherwise expressly qualified. For those of ordinary skill in the art, the specific meanings of the above terms in the present disclosure may be understood according to specific situations.

In the present disclosure, unless otherwise expressly specified and limited, a first feature "on" or "under" a second feature may be a direct contact between the first and second features, or the first and second features may be in an indirect contact through an intermedium. Also, the first feature being "above", "over" and "on" the second feature may mean that the first feature is directly above or obliquely above the second feature, or simply mean that the first feature is higher than the second feature. The first feature being "below", "under" or "beneath" the second feature may mean that the first feature is directly below or obliquely below the second feature, or simply means that the first feature has a lower level than the second feature.

In the present disclosure, when the terms "one embodiment", "some embodiments", "example", "specific example", or "some examples" etc. appear, they mean the specific features, structures, structures, materials or features described in the embodiments or examples may be included in at least one embodiment or example of the present disclosure. In the present disclosure, schematic representations of the above terms are not necessarily directed to the same embodiment or example. Furthermore, the particular features, structures, materials or characteristics described may be combined in any suitable manner in any one or more embodiments or examples. Furthermore, those skilled in the art may combine the different embodiments or examples described in this specification, as well as the features of the different embodiments or examples, without conflicting each other.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display panel, comprising:

a plurality of pixel row groups numbered from a first pixel row group to an N-th pixel row group, wherein:

an i-th pixel row group includes a first pixel row to an M-th pixel row, a j-th pixel row includes first pixels and second pixels arranged along a same straight line or arranged along two separate straight lines, wherein a luminous efficiency of corresponding color light of a first pixel is lower than a luminous efficiency of corresponding color light of a second pixel; and N is an integer larger than or equal to 2, M is an integer larger than or equal to 1, i is a positive integer less than or equal to N, and j is a positive integer less than or equal to M, a plurality of scanning driving circuits numbered from a first scanning driving circuit to an N-th scanning driving circuit, wherein an i-th scanning driving circuit includes a first sub scanning driving circuit and a second sub scanning driving circuit, the first sub scanning driving circuit is electrically connected to all first pixels in the i-th pixel row group, and the second sub scanning driving circuit is electrically connected to all second pixels in the i-th pixel row group;

first data lines electrically connected to the first pixels in the i-th pixel row group, wherein different first pixels are electrically connected to different first data lines;

second data lines electrically connected to the second pixels in the i-th pixel row group, wherein different second pixels are electrically connected to different second data line; and a data control circuit electrically connected to the first data lines and the second data lines, wherein:

the data control circuit includes a plurality of first switch transistors connected to the first data lines and a plurality of second switch transistors connected to the second data lines; wherein each of the plurality of first switch transistors comprises a first control signal terminal controlled by a same first control signal, and each of the plurality of second switch transistors comprises a second control signal terminal controlled by a same second control signal, and in at least one image frame, a duration during which one first pixel is connected to one corresponding first data line for transmitting data voltage controlled by one corresponding first sub scanning driving circuit is larger than a duration during which one second pixel is connected to one corresponding second data line for transmitting data voltage controlled by one corresponding second sub scanning driving circuit, and when the first sub-scanning driving circuit and the second sub-scanning driving circuit in one scanning driving circuit control the respective corresponding pixels to be connected to the respective corresponding data lines, a conduction duration of the plurality of first switch transistors controlled by the first control signal terminals is longer than a conduction duration of the plurality of second switch transistors controlled by the second control signal terminals.

2. The display panel according to claim 1, wherein the at least one image frame includes a first image frame when the display panel is powered on.

3. The display panel according to claim 1, wherein:

when M equals to 1, in the i-th scanning driving circuit, the first sub-scanning driving circuit and the second sub-scanning driving circuit have the same output driving waveform; and when the first sub-scanning driving circuit and the second sub-scanning driving circuit in one scanning driving circuit control the respective corresponding pixels to be connected to the respective corresponding data lines, a duration of the first data lines to be connected to the data voltage controlled by the data control circuit is larger than a duration of the second data lines to be connected to the data voltage controlled by the data control circuit.

4. The display panel according to claim 3, wherein:

the data control circuit further includes a data voltage generating sub-circuit;

in one of the plurality of first switch transistors, a first terminal is electrically connected to one corresponding first data line, a second terminal is electrically connected to the data voltage generating sub-circuit; and in one of the plurality of second switch transistors, a first terminal is electrically connected to one corresponding second data line, a second terminal is electrically connected to the data voltage generating sub-circuit.

5. The display panel according to claim 4, wherein:

conduction types of the plurality of first switch transistors are same and all first control signal terminals are a same terminal; and/or conduction types of the plurality of second switch transistors are same and all second control signal terminals are a same terminal.

6. The display panel according to claim 4, wherein:

the plurality of first switch transistors and the plurality of second switch transistors have same conduction types.

7. The display device according to claim 3, wherein:

the first sub scanning driving circuit and the second sub scanning driving circuit in one scanning driving circuit are a same sub scanning driving circuit;

the i-th scanning driving circuit further includes a demultiplexer, wherein an input terminal of the demultiplexer is electrically connected to the corresponding sub scanning driving circuit, a first output terminal of the demultiplexer is electrically connected to all of the first pixels in the i-th pixel row group, and a second output terminal of the demultiplexer is electrically connected to all of the second pixels in the i-th pixel row group.

8. The display panel according to claim 1, wherein:

in the i-th scanning driving circuit, the first sub scanning driving circuit and the second sub scanning driving circuit are connected to turn-on signals one by one; and a connection duration of the first pixels in the i-th pixel row group and the corresponding first data lines controlled by the first sub scanning driving circuit is longer than a connection duration of the second pixels in the i-th pixel row group and the corresponding second data lines controlled by the second sub scanning driving circuit.

9. The display panel according to claim 1, wherein:

in the at least one image frame, a light-emitting duration of first pixels controlled by the first sub scanning driving circuits is longer than a light-emitting duration of second pixels controlled by the second sub-scan driving circuits.

10. The display panel according to claim 1, wherein:

in the at least one image frame, the duration during which the first pixel is connected to the corresponding first data line controlled by the corresponding first sub scanning driving circuit includes a first duration and a second duration; and the first duration and the second duration are two consecutive durations.

11. The display panel according to claim 1, wherein:

in the at least one image frame, the duration during which the first pixel is connected to the corresponding first data lines controlled by the corresponding first sub scanning driving circuit includes a first duration and a second duration; and the first duration and the second duration are two non-consecutive durations.

12. The display panel according to claim 9, wherein:

M is larger than or equal to 2; and in data lines corresponding to the i-th pixel row groups, at least one pair of the first data line and the second data line is a same data line.

13. The display panel according to claim 1, wherein:

the first pixels in the j-th pixel row are green pixels, and the second pixels in the j-th pixel row include red pixels and/or blue pixels.

14. A display device, comprising a display panel, wherein:

the display panel includes:

a plurality of pixel row groups numbered from a first pixel row group to an N-th pixel row group, wherein:

an i-th pixel row group includes a first pixel row to an M-th pixel row, a j-th pixel row includes a first pixel and a second pixel wherein a luminous efficiency of corresponding color light of a first pixel is lower than a luminous efficiency of corresponding color light of a second pixel; and N is an integer larger than or equal to 2, M is an integer larger than or equal to 1, i is a positive integer less than or equal to N, and j is a positive integer less than or equal to M, a plurality of scanning driving circuits numbered from a first scanning driving circuit to an N-th scanning driving circuit, wherein an i-th scanning driving circuit includes a first sub scanning driving circuit and a second sub scanning driving circuit, the first sub scanning driving circuit is electrically connected to all first pixels in the i-th pixel row group, and the second sub scanning driving circuit is electrically connected to all second pixels in the i-th pixel row group;

first data lines electrically connected to the first pixels in the i-th pixel row group, wherein different first pixels are electrically connected to different first data lines;

second data lines electrically connected to the second pixels in the i-th pixel row group, wherein different second pixels are electrically connected to different second data line; and a data control circuit electrically connected to the first data lines and the second data lines, wherein:

the data control circuit includes a plurality of first switch transistors connected to the first data lines and a plurality of second switch transistors connected to the second data lines; wherein each of the plurality of first switch transistors comprises a first control signal terminal controlled by a same first control signal, and each of the plurality of second switch transistors comprises a second control signal terminal controlled by a same second control signal, and in at least one image frame, a duration during which one first pixel is connected to one corresponding first data line for transmitting data voltage controlled by one corresponding first sub scanning driving circuit is larger than a duration during which one second pixel is connected to one corresponding second data line for transmitting data voltage controlled by one corresponding second sub scanning driving circuit, and when the first sub-scanning driving circuit and the second sub-scanning driving circuit in one scanning driving circuit control the respective corresponding pixels to be connected to the respective corresponding data lines, a conduction duration of the plurality of first switch transistors controlled by the first control signal terminals is longer than a conduction duration of the plurality of second switch transistors controlled by the second control signal terminals.

* * * * *